| United States Patent [19] | [11] 4,076,526 |
|---|---|
| Mulvaney et al. | [45] Feb. 28, 1978 |

[54] PHOTOCONDUCTIVE N-VINYL CARBAZOLE COPOLYMERS AND PROCESS FOR PREPARING SAME

[75] Inventors: James E. Mulvaney, Tucson, Ariz.; Raymond W. Rupp, Greenville, S.C.

[73] Assignee: The Sherwin-Williams Company, Cleveland, Ohio

[21] Appl. No.: 768,008

[22] Filed: Feb. 11, 1977

[51] Int. Cl.$^2$ .......................... G03G 5/04; G03G 5/07
[52] U.S. Cl. ..................................... 96/1.5 R; 526/9; 526/10; 526/263
[58] Field of Search ................. 96/1.5, 1.6, 1.7, 1 PC; 526/249, 284, 263, 9, 10, 11

[56] References Cited

U.S. PATENT DOCUMENTS

| 3,418,116 | 12/1968 | Inami et al. | 96/1.5 |
| 3,779,750 | 12/1973 | Merrill et al. | 96/1.5 |
| 4,007,043 | 2/1977 | Stolka et al. | 96/1.5 |

*Primary Examiner*—Roland E. Martin, Jr.
*Assistant Examiner*—John L. Goodrow
*Attorney, Agent, or Firm*—James V. Tura; Richard G. Smith; Neil A. DuChez

[57] ABSTRACT

The invention relates to photoconductive N-vinyl carbazole copolymers characterized as having electron donor and electron acceptor groups in the same polymeric chain and the use of said copolymers as photoconductive materials on various substrates.

4 Claims, No Drawings

PHOTOCONDUCTIVE N-VINYL CARBAZOLE COPOLYMERS AND PROCESS FOR PREPARING SAME

This invention relates to photoconductive copolymers having electron donor and electron acceptor groups in the same polymeric chain and to the process of preparing said copolymers. More particularly, this invention relates to photoconductive N-vinyl carbazole copolymers and to the use of said copolymers as a dispersion in a resin binder or as a polymeric photoconductive material on a substrate.

Photoelectrostatic imaging processes comprises a photoconductive medium which is charged in the dark and exposed to a pattern of light to produce an image of the pattern desired to be reproduced. The image is subsequently developed by applying an electrostatic attractable powder, e.g. toner to the charged areas of the image. The photoconductive medium generally comprises a conductive support to which is applied a photoconductive layer including, for example, zinc oxide or an organic material, etc. Where an inorganic photoconductive material is employed, the inorganic material is generally dispersed in a resin and applied as a film onto a support. Organic photoconductive materials, however, may be polymeric and, therefore, can be used to form the photoconductive film on the substrate. However, the organic photoconductive compounds, like the inorganic compounds, may be dispersed in an organic binder and then applied to a conductive support to obtain the photoconductive member.

Organic photoconductive polymers are well known and include, for example, poly(N-vinyl carbazole) which has an intrinsic absorption of light in the near U.V. and to be useful commercially requires the addition of a sensitizer to extend its light of absorption into the visible range. This is accomplished most efficiently by formation of charge transfer complexes as particularly pointed out in U.S. Pat. No. 3,162,532. Highly efficient systems have been achieved by adding a Lewis acid, e.g. 2,4,7-trinitro fluorenone to the polymer to form the donor-acceptor complex with the polymer which acts as the donor. It has been demonstrated that the planar donor groups of the polymer must be arranged specifically so that they are in parallel planes and separated by such distance that the acceptor can be sandwiched between two donor groups to form the complex, see Wagener and Gassner, *Photographic Science and Engineering* 14, 205 (1970) and U.S. Pat. No. 3,484,237.

The photoconductive polymers of this invention, however, differ significantly from the prior art even though the sensitization is still by formation of a donor-acceptor complex. In accordance with this invention, the acceptor group is the comonomer, e.g. vinyl dinitrobenzoate and there is no need for the addition of an external sensitizer since the polymer is intrinsically photoconductive with absorption in the low 400 nm ranges. These copolymers are particularly characterized as having an oxygen linkage between the polymer backbone and the carbonyl group of the comonomer. Molecular models of the polymer indicate that overlap is possible between the carbazyl and the comonomer, but that with the oxygen linkage present there is less steric influence, since the carbonyl is directed away from the backbone of the polymer. The vinyl carbazole-vinyl dinitrobenzoate copolymers are superior as photoconductors primarily because of the fact that the acceptor is very strong due to the electron withdrawing nature of the nitro groups present. The strength (or effectiveness) of the complex with a fixed donor (vinyl carbazole) is influenced by the acceptor strength and geometry of the complex. The important geometric relationships include the degree of coplanarity and the degree of overlap or superposition of the donor and acceptor. In the case of the vinyl carbazole — vinyl dinitrobenzoate copolymer the backbone linkage to the acceptor is an ether linkage which provides the proper geometry for good donor-acceptor interaction. Thus, it has been found in accordance with this invention that the vinylcarbazole-vinyl dinitrobenzoate copolymers under exposure to a quartz halogen lamp at 140 foot candles are at least as fast as the vinylcarbazole homopolymer sensitized externally with well-known sensitizing agents, e.g. containing 10% of para-chloranil.

The new organic photoconductive copolymers were developed with the purpose of eliminating the use of dopants by preparing a copolymer wherein the electron acceptor groups are incorporated into the polymeric chain which enhances the charge transfer complex by having the donor and acceptor chemically bound to the same polymer backbone.

This invention is directed to the concept of preparing photosensitive materials or copolymers for electrophotography wherein monomer units functioning as electron donor and electron acceptor, are utilized to obtain high molecular weight polymers wherein both of the units are arranged at adequate distances from each other along the backbone of the polymeric chain. The high molecular weight polymers have film-forming characteristics and, therefore, can be applied to a support by conventional means. This support may be treated to render it conductive or on the other hand it may be metal or metal foil such as aluminum, copper, zinc, etc. In addition, various films which have been metallized such as polyester film have given good results as a conductive support. It is essential that the support have a conductivity in the range of from $10^{-9}$ mohs/cm$^2$ up to the conductivity of metal.

Accordingly, it is an object of this invention to provide a polymeric photoconductive polymer having improved physical and photoresponsive properties comprising electron donor and electron acceptor groups in the same polymer chain. It is another object of this invention to provide novel polymeric copolymers having improved photoresponse properties which are capable of forming films on a conductive surface. It is a further object of this invention to provide an electrophotographic copolymer consisting of vinyl monomer units having aromatic and heterocyclic substituents capable of functioning as electron donor and electron acceptor groups.

The photoconductive N-vinyl carbazole copolymers of this invention are characterized as having electron donor and electron acceptor groups in the same polymer chain and have a repeat unit of the formula:

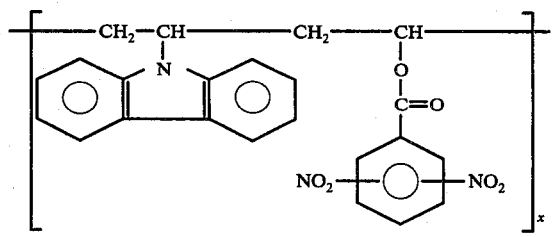

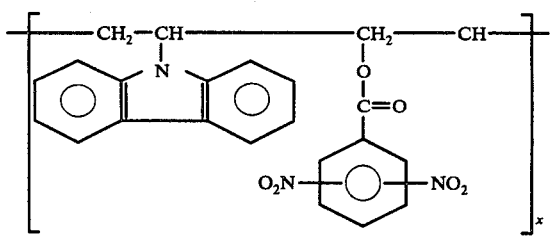

Cbz is carbazole group.
OAc is acetate group.

wherein X has a value of at least two as illustrated by the intrinsic viscosity of the polymers given in Table I. The copolymers are prepared by copolymerizing N-vinyl carbazole and vinyl acetate in an organic medium in the presence of a free radical catalyst to obtain the corresponding N-vinyl carbazole-vinyl acetate copolymer. This copolymer is hydrolyzed to obtain N-vinyl carbazole-vinyl alcohol copolymer which is subsequently reacted with a dinitrobenzoyl halide such as the chloride to obtain a copolymer having N-vinyl carbazole groups and N-vinyl dinitrobenzoate groups bonded to the backbone of the polymer.

The copolymers of N-vinyl carbazole and vinyl-3,5-dinitrobenzoate were obtained by reacting N-vinyl carbazole and vinyl acetate as illustrated by the following equations. The materials obtained from the reaction are copolymers as determined by NMR Spectroscopy. Polyvinyl carbazole has two exceptionally high field signals in the aromatic region of its NMR Spectrum due to ring current interactions between adjacent carbazole units in the polymer. These high field signals were not observed with the copolymer of this invention.

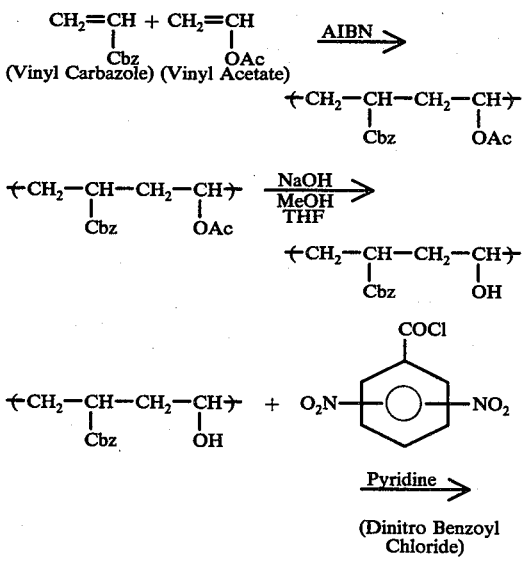

The semi-quantitative nature of the conversion of the vinyl acetate-vinyl carbazole comonomers to intermediate copolymers is illustrated by the equation shown in Table I.

The RC time for copolymers of this invention is shown in Table II and it should be noted that the copolymers are nearly the same as the RC time of N-vinyl polycarbazole doped with 10% chloranil. However, the addition of chloranil to the copolymers of this invention does not improve the photoresponse and in fact appears to slow the response down.

The RC time (Resistance Capacitance Time) was measured by using a quartz halogen light source producing 140 foot candles at the image plane coupled with conventional electrical sensing and recording equipment. The polymeric coating is placed under the probes and the light is turned on using the shutter. A fiber optic-photomultiplier instantaneously detects the light and turns on a dual trace storage-type oscilloscope. The current measurement utilizes the probe directly under the light source and this signal is fed to an electrometer and onto the oscilloscope. Voltage is measured by the probe which is not directly in line with the illumination. The signal is also fed to an electrometer and an oscilloscope. RC time is determined by measuring the peak height in the current line graph and multiplying by 1/e (0.37). The RC time was chosen as the measure of photoresponse because of its relation to a first order rate constant for charge decay as discussed by Wagener and Gassner, *Photographic Science and Engineering*, 14, 205 (1970). The RC time of the current vs. time curve as opposed to the voltage-time curve was used because of increased sensitivity and reduced influence by the ambient conditions of temperature and humidity.

TABLE I

Composition of Intermediates and Final Product in Synthesis of Copoly(N-Vinyl Carbazole Vinyl-3,5-Dinitrobenzoate)

| Copoly(N-Vinyl Carbazole-Vinyl Acetate) | | | Copoly(N-Vinyl Carbazole-Vinyl Alcohol) | | | Copoly(N-Vinyl Carbazole-Vinyl-3,5-Dinitrobenzoate) | | |
| --- | --- | --- | --- | --- | --- | --- | --- | --- |
| Percent N | Percent Vinyl Acetate | $[\eta]$* | Percent N | Percent Vinyl Alcohol | $[\eta]$ | Percent N | Percent Vinyl-3,5-Dinitrobenzoate | $[\eta]$ |
| 6.58 | 18.7 | — | — | — | — | 7.95 | 15.5 | 0.26 |
| — | — | — | — | — | — | 9.23 | 43.9 | 0.18 |
| 4.87 | 52.1 | 0.25 | 5.77 | 53.4 | 0.22 | 9.56 | 51.0 | 0.18 |

$[\eta]$* is intrinsic viscosity of the copolymer (function of molecular weight).

TABLE II

Photoconductivity of Sensitized and Unsensitized Vinyl Carbazole Polymers and Copolymers

| Copolymer | Mole %DNB | Sensitizer | Time at V=O | RC Time (Current vs. Time Curve) |
|---|---|---|---|---|
| VCbz-DNB[1] | 53 | None | 6 sec. | 0.2 sec. |
| VCbz-DNB | 53 | 10% chloranil[3] | 11 sec. | 0.4 sec. |
| VCbz-DNB | 44 | None | 12 sec. | 0.24 sec. |
| VCbz-DNB | 44 | 10% chloranil | 18 sec. | 0.46 sec. |
| VCbz-DNB | 16 | None | 6 sec. | 0.16 sec. |
| VCbz-DNB | 16 | 10% chloranil | 6 sec. | 0.26 sec. |
| Poly VCbz[2] | 0 | None | >18 sec. | 3.0 sec. |
| Poly VCbz | 0 | 10% chloranil | 18 sec. | 0.3 sec. |

[1]DNB is vinyl-3,5-dinitro benzoate.
[2]VCbz is N-vinylcarbazole.
[3]Weight percent based on the weight of polymer or copolymer present.

To illustrate the photoconductivity, the copolymer of this invention was applied to a conductive substrate, i.e. aluminum panels in film thicknesses of about one mil. Electrical measurements were taken on the coated samples by using a light source of a quartz iodide lamp adjusted to give intensities up to 140 ft. candles at the exposed surface. The light is directed through an electrical probe composed of a wire grid which detects the charge on the sample, the signal from the probe is fed into an electrometer and then to an oscilloscope which is triggered by the light. The samples were electrically charged by a corona which operates at a negative 6,000 volts. The samples were placed under the probe and the light source initiates photodischarge. The discharge curve is then observed by the oscilloscope and may be photographed on film.

The photoconductivity of the vinyl carbazole-vinyl dinitrobenzoate copolymer may be illustrated by the data in Table III. Here photoconductivity data of the copolymer as well as the homopolymer of poly(vinyl carbazole) shows that the unsensitized copolymers are slightly better photoconductors than the sensitized poly(vinyl carbazole). Moreover, from the data in the Table, it should be observed that the electrophotographic speed of the copolymer is not changed by increasing the percentage of the vinyl-3,5-dinitrobenzoate from 16 to 44 to 53%, which gives an economic advantage to the copolymer. The addition of Chloranil to the copolymer caused a decrease in the electrophotographic speed which indicates that the Choranil competes with the dinitrobenzoate groups on the copolymer, thereby decreasing the sensitivity. However, the addition of Chloranil to the homopolymer of vinyl carbazole leads to a substantial increase in sensitivity.

EXAMPLE A

Preparation of Copoly(N-Vinyl Carbazole-Vinyl 3,5-Dinitrobenzoate)

Copoly(N-Vinyl Carbazole-Vinyl Acetate)

Dry benzene (100 ml) was placed in a 250 ml three neck round bottom flask equipped with a nitrogen inlet and a reflux condenser. The flask was wrapped with aluminum foil to exclude light, and nitrogen was passed through the benzene for one hour. N-Vinyl carbazole (19.3 g; 0.1 mmol) and vinyl acetate (43.0 g; 0.50 mmol) were then added and the mixture stirred to dissolve the N-vinyl carbazole. Azobisisobutyronitrile (150 mg) was added and the solution stirred at 60°-70° C for 20 hours. The resulting viscous solution was precipitated into 600 ml of methanol. The isolated polymer was purified by two subsequent precipitations from chloroform into methanol. The final polymer was obtained in 23% yield and was found to contain 47.9 mole percent N-vinyl carbazole (calculated from nitrogen analysis).

Copoly(N-Vinyl Carbazole-Vinyl Alcohol)

Copoly(N-vinyl carbazole-vinyl acetate) (5.0 g) was dissolved in 100 ml of tetrahydrofuran and 25 ml of I N methanolic sodium hydroxide was added. The solution was stirred for 3 hours at 60° C and precipitated into 600 ml of methanol. The polymer was purified by two additional precipitations from tetrahydrofuran into methanol. The purified polymer was obtained in 90% yield and was found to contain 46.6 mole percent N-vinyl carbazole (calculated from nitrogen analysis).

Copoly(N-Vinyl Carbazole-Vinyl 3,5-Dinitrobenzoate)

Copoly(N-vinyl carbazole-Vinyl alcohol) (II) (2.0 g) was dissolved in 50 ml of anhydrous pyridine. 3,5-Dinitrobenzoyl chloride (3.88 g) in 15 ml of anhydrous benzene was added with stirring to the pyridine solution. The resulting orange solution was stirred at room tem-

TABLE III

Photoconductivity of Sensitized and Unsensitized Vinyl Carbazole Polymers and Copolymers

| Polymer | % DNB | Sensitizer | Time at V=O | RC Time Voltage vs. Time Curve | 1/t at V=Vo/2 |
|---|---|---|---|---|---|
| VCbz-DNB* | 53 | None | 6 sec. | 0.4 sec. | 5.0 |
| VCbz-DNB | 53 | 10% Chloranil | 11 sec. | 1.0 sec. | 1.67 |
| VCbz-DNB | 44 | None | 12 sec. | 0.5 sec. | 2.5 |
| VCbz-DNB | 44 | 10% Chloranil | 18 sec. | 1.2 sec. | 1.25 |
| VCbz-DNB | 16 | None | 6 sec. | 0.4 sec. | 5.0 |
| VCbz-DNB | 16 | 10% Chloranil | 6 sec. | 0.6 sec. | 2.5 |
| VCbz | 0 | None | >18 sec. | 6.6 sec. | 0.27 |
| VCbz | 0 | 10% Chloranil | 18 sec. | 1.0 sec. | 1.67 |

*VCbz-DNB is vinyl 3,5-dinitro benzoate.

perature for 4 hours. The small amount of solid remaining in the reaction mixture was collected on a filter and the filtrate was poured into 400 ml of methanol. The isolated polymer was purified by two precipitations from tetrahydrofuran into methanol to give 3.2 grams of a yellow powder. Nitrogen analysis demonstrated that the reaction of the alcohol groups with the acid chloride was nearly quantitative.

The tetrahydrofuran (THF) was purified by distilling under nitrogen from lithium-aluminum hydride. Immediately prior to using the THF as a polymerization solvent, it was passed through a two-foot column of neutral alumina to remove any remaining peroxide. The N-vinyl carbazole was purified by dissolving it in dichloromethane and washing three times with 5% sodium hydroxide and several times with deionized water. The dichloromethane solution was dried over magnesium sulfate and filtered into a flask. The flask was wrapped to exclude light and the dichloromethane stripped off under a vacuum at room temperature. The resulting white solid was dissolved in hot methanol and the solution filtered to remove any insoluble polymeric material. The solution was cooled to −20° C and the resulting white crystals were collected on a filter to give N-vinyl carbazole having a melting point of 60.5° to 65.5° C. The vinyl acetate was purified by distillation under a vacuum and stored at −20° C prior to being used in the polymerization. The azobisisobutyronitrile (AIBN) was purified by recrystallizing at least two times from diethylether and the purified product had a melting point of 104°–105° C.

It was found by examination of molecular models that with a carbonyl linkage to the backbone of the polymer, the freedom of movement of the comonomer is severely limited sterically. The carbonyl oxygen is directed towards the backbone and the aromatic portion of the comonomer is somewhat removed from the carbazole. For the ether linkage, however, the opposite situation exists in that the carbonyl oxygen is directed away from the backbone, there is more freedom of movement between the monomer adjacent units and interaction between monomer units is facilitated. Therefore, according to the molecular models, for the intrinsically photoconductive copolymers of this invention, it is necessary that the comonomer contain an ether linkage to the backbone of the polymer and that the group adjacent to the linkage would be a strong Lewis acid (electron acceptor).

Intrinsic photoconductors include compositions which produce photospeed in the absence of added sensitizers. The copolymer is sensitized by interaction of the comonomer along the polymer chain. N-vinyl carbazole is sensitized by the addition of a Lewis acid which allows a charge transfer complex to be formed with the vinyl carbazole which is a Lewis base. A new absorption maximum, due to the complex is formed which is sensitive at a higher wavelength than the N-vinyl carbazole alone.

The copolymers of this invention may be applied onto various electroconductive surfaces and used for electrophotographic purposes by dissolving the polymer in an organic solvent and applying the solution, as a film, on the support by casting, coating, spraying, etc. The substrates that may be coated include materials that satisfy the requirements of electrophotography such as metal, glass, plates, paper, foils and various electroconductive resins or plastics. These include various polymers such as poly(vinyl alcohol), polyamides, polyurethanes, cellulose acetates, polyesters, polyolefins, etc. which can be converted into an electroconductive material by chemical treatment or by the introduction of a material which render the polymers electrically conductive.

While this invention has been described by a number of specific embodiments, it is obvious there are variations and modifications which can be made without departing from the spirit and scope of the invention as set forth in the appended claims.

The invention claimed is:

1. A photoconductive N-vinyl carbazole copolymer having electron donor and electron acceptor groups in the same polymer chain characterized by a repeat unit of the formula:

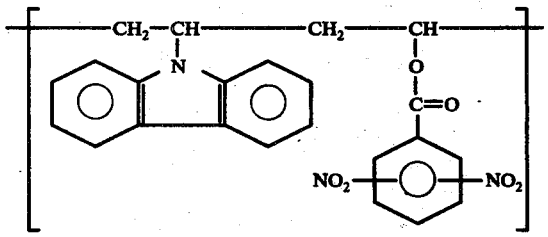

wherein $x$ has a value of at least two.

2. A process for preparing a photoconductive copolymer having electron donor and electron acceptor groups in the same polymer chain which comprises polymerizing N-vinyl carbazole and vinyl acetate in an organic medium in the presence of a free-radical catalyst at temperatures of at least 25° C to obtain N-vinyl carbazole-vinyl acetate copolymer; hydrolyzing said copolymer to obtain N-vinylcarbazole-vinyl alcohol copolymer and subsequently reacting said vinyl alcohol copolymer with approximately one mole of dinitrobenzoyl halide for each vinyl alcohol group in the copolymer to obtain copolymer having N-vinyl carbazole and vinyldinitrobenzoate groups bonded to the backbone of the polymer.

3. The photoconductive N-vinyl carbazole copolymer of claim 1 further characterized as being a N-vinyl carbazole-vinyl 3,5-dinitrobenzoate copolymer.

4. The process of claim 2 further characterized in that the N-vinyl carbazole and vinyl acetate are copolymerized in an organic medium comprising an aromatic hydrocarbon at temperatures ranging from about 60° to 70° C.

* * * * *